United States Patent [19]

Fischer

[11] Patent Number: 4,794,028
[45] Date of Patent: Dec. 27, 1988

[54] METHOD FOR CONTINUOUSLY PRODUCING A MULTI-HOOK FASTNER MEMBER AND PRODUCT OF THE METHOD

[75] Inventor: James R. Fischer, Sheboygan, Wis.

[73] Assignee: Velcro Industries B.V., Amsterdam, Netherlands

[21] Appl. No.: 865,575

[22] Filed: May 15, 1986

Related U.S. Application Data

[63] Continuation of Ser. No. 600,990, Apr. 16, 1984, abandoned.

[51] Int. Cl.$^4$ ............... B29C 43/46; B29C 43/22; A44B 18/00
[52] U.S. Cl. .................................. 428/100; 24/31 V; 24/306; 24/442
[58] Field of Search ............... 264/145, 146, 160, 167, 264/175, 237, 243, 280, 284, 285, 318, 334, 209.3, 161, DIG. 66; 428/100; 24/31 V, 306, 442

[56] References Cited

U.S. PATENT DOCUMENTS

| | | | |
|---|---|---|---|
| 483,663 | 10/1892 | Warren | 425/350 |
| 819,150 | 5/1906 | Mahoney | 425/325 |
| 2,327,627 | 8/1943 | Esselen | 264/216 |
| 2,362,410 | 11/1944 | Scherer | 29/523 |
| 2,489,951 | 11/1949 | Bump | 425/461 |
| 2,907,365 | 10/1959 | MacDonald | 152/209 R |
| 2,964,789 | 12/1960 | Conder et al. | 425/236 |
| 3,031,730 | 5/1962 | Morin | 24/444 |
| 3,085,292 | 4/1963 | Kindseth | 264/167 |
| 3,089,191 | 5/1963 | Conrad | 264/175 |
| 3,147,528 | 9/1964 | Erb | 24/452 |
| 3,175,026 | 3/1965 | James | 425/327 |
| 3,196,196 | 7/1965 | Burbank | 264/251 |
| 3,196,490 | 7/1965 | Erb | 425/121 |
| 3,235,438 | 2/1966 | Wisotzky | 428/85 |
| 3,241,182 | 3/1966 | Kessler | 425/327 |
| 3,243,339 | 3/1966 | Scragg et al. | 428/399 |
| 3,312,583 | 4/1967 | Rochlis | 428/88 |
| 3,316,592 | 5/1967 | Forrest | 425/174.8 R |
| 3,317,644 | 5/1967 | Takai | 264/246 |
| 3,369,274 | 2/1968 | Dicks et al. | 425/174.8 E |
| 3,390,044 | 6/1968 | Malakoff | 428/17 |
| 3,394,431 | 7/1968 | Nalle, Jr. | 425/71 |
| 3,414,948 | 12/1968 | Cuckson et al. | 24/408 |
| 3,439,383 | 4/1969 | Meitinger | 425/115 |
| 3,445,915 | 5/1969 | Cuckson | 29/408 |
| 3,507,010 | 4/1970 | Doleman et al. | 425/134 |
| 3,555,601 | 1/1971 | Price | 425/327 |

(List continued on next page.)

FOREIGN PATENT DOCUMENTS 297103 5/1954 Switzerland .

OTHER PUBLICATIONS

Process and Equipment for In-Line Post-Extrusion Forming; *Plastic Machinery & Equipment;* Sidney Levy; pp. 26,27,28,30; Aug., 1978.

Slitting and Winding; *Modern Plastics Encyclopedia* 1980-1981; J. H. Rienau; pp. 472-474.

*Primary Examiner*—Willard E. Hoag
*Attorney, Agent, or Firm*—Hayes, Soloway, Hennessey & Hage

[57] ABSTRACT

A method of continuously producing an elongated strip-like fastener member is disclosed which facilitates highly efficient formation of the fastener member with a great multiplicity of resiliently flexible hook-like projections. The method comprises the formation of an extrusion of plastic material which is shaped between a pair of coacting first and second rollers. Notably, one of the rollers defines a plurality of hook-forming cavities about its periphery within which the hook projections of the fastener member are formed. The forming roller is suitably cooled so as to effect substantial reduction in the temperature of the molten plastic extrusion from which the fastener member is formed. In this manner, the fastener member may be removed or stripped from the forming roller without opening of the hook-forming cavities, thus promoting highly efficient formation of the fastener member without resort to unduly complex equipment or processes.

27 Claims, 3 Drawing Sheets

U.S. PATENT DOCUMENTS

| | | | |
|---|---|---|---|
| 3,557,407 | 1/1971 | Lemelson | 425/327 |
| 3,590,109 | 6/1971 | Doleman et al. | 264/167 |
| 3,594,863 | 7/1971 | Erb | 425/505 |
| 3,594,865 | 7/1971 | Erb | 425/129 R |
| 3,708,833 | 1/1973 | Ribich et al. | 24/204 |
| 3,729,364 | 4/1973 | Doleman et al. | 428/17 |
| 3,732,600 | 5/1973 | Perina | 24/306 |
| 3,752,619 | 8/1973 | Menzin et al. | 425/134 |
| 3,758,657 | 5/1973 | Menzin et al. | 264/166 |
| 3,917,787 | 11/1975 | Hansen | 425/814 |
| 3,954,368 | 5/1976 | Kawakami | 425/326 R |
| 3,988,401 | 10/1976 | Kasting et al. | 264/37 |
| 4,097,634 | 1/1978 | Bergh | 428/156 |
| 4,162,757 | 7/1979 | Lemelson | 156/500 |
| 4,169,303 | 10/1979 | Lemelson | 24/452 |
| 4,289,470 | 9/1981 | Johnston | 425/336 |
| 4,290,174 | 9/1981 | Kalleberg | 24/444 |
| 4,323,533 | 4/1982 | Bramhall | 264/145 |
| 4,451,421 | 5/1984 | Jones et al. | 264/167 |

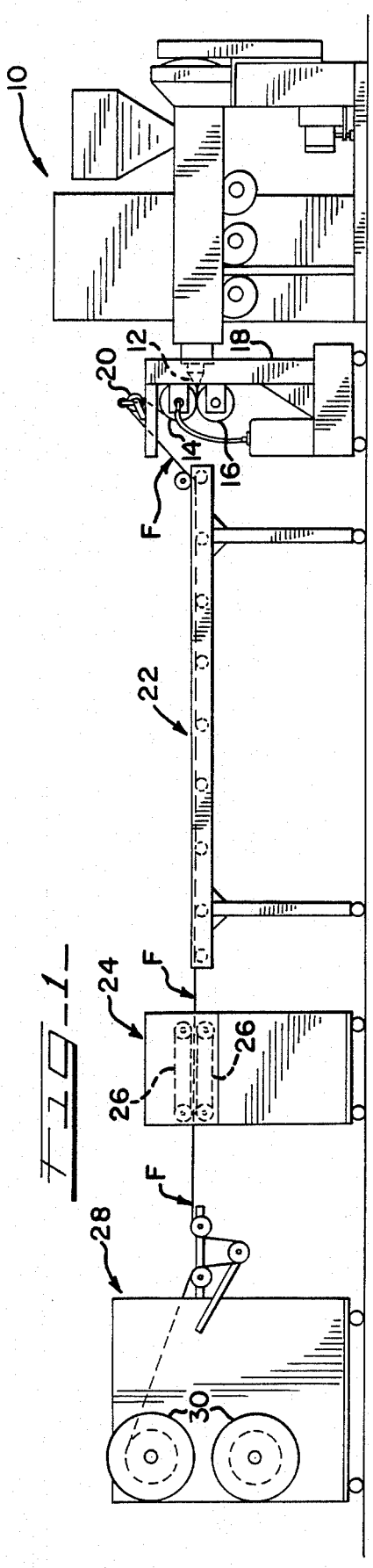
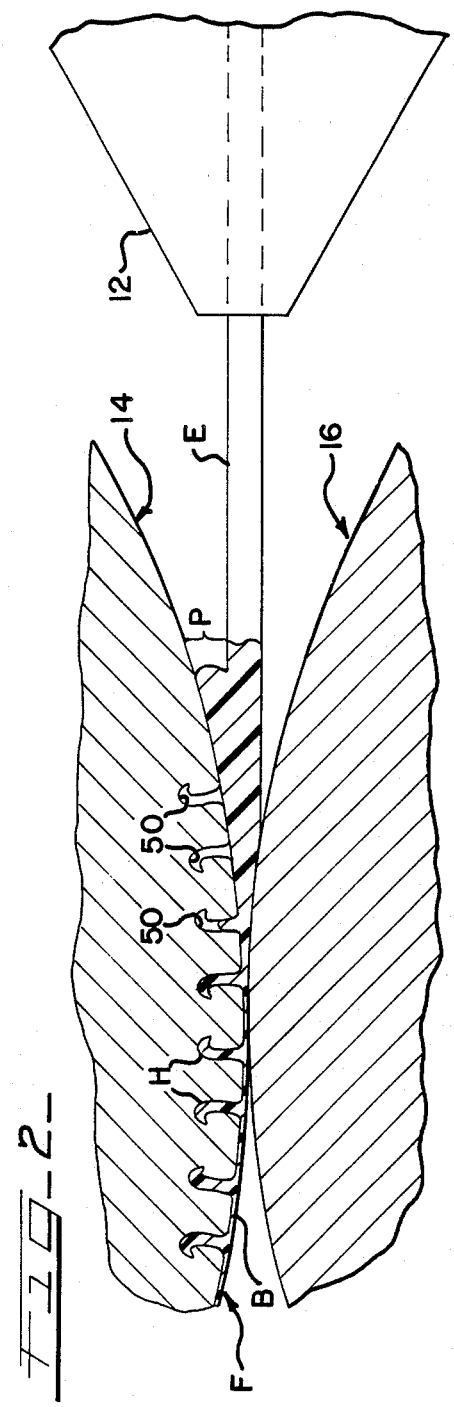

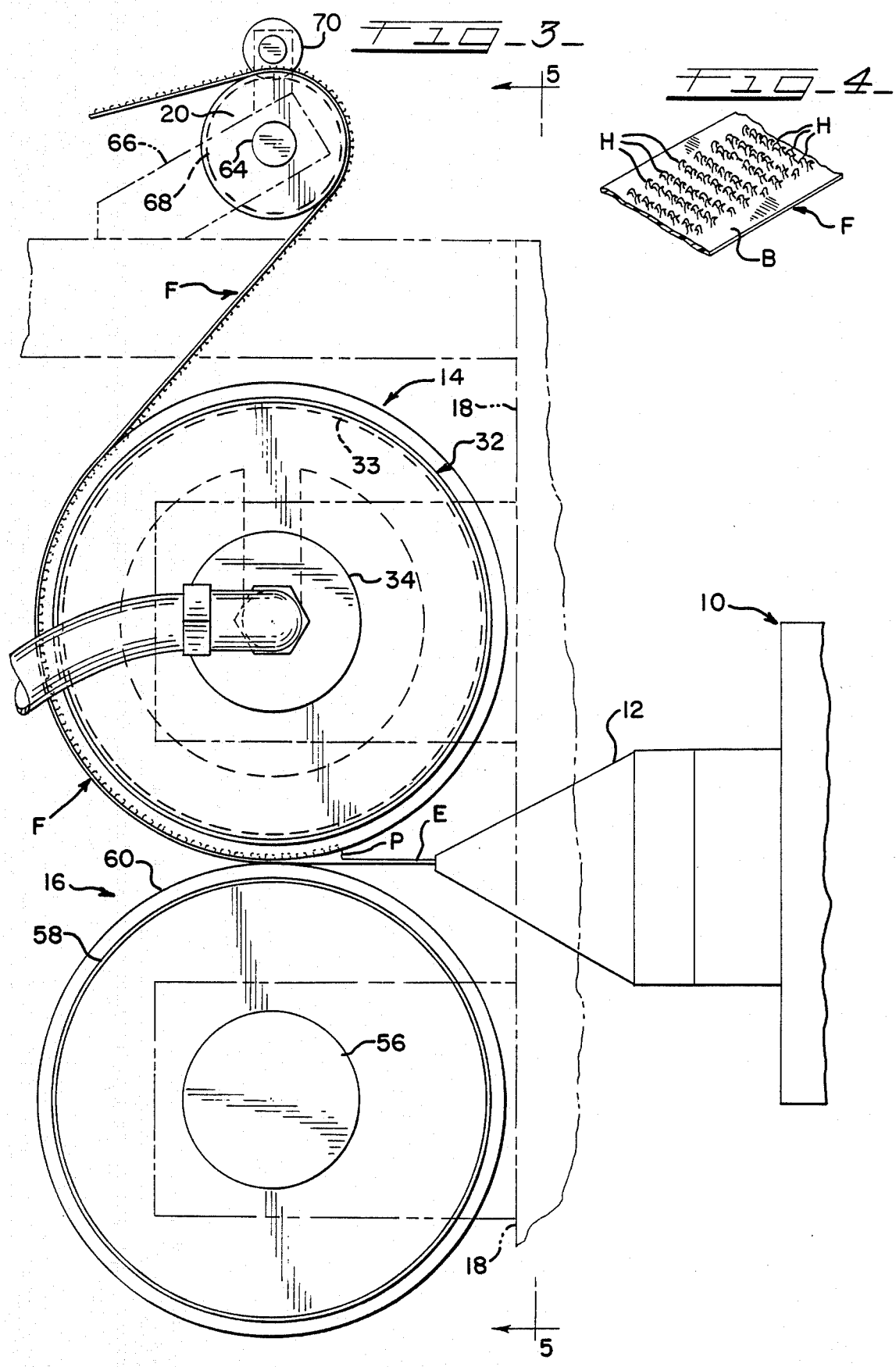

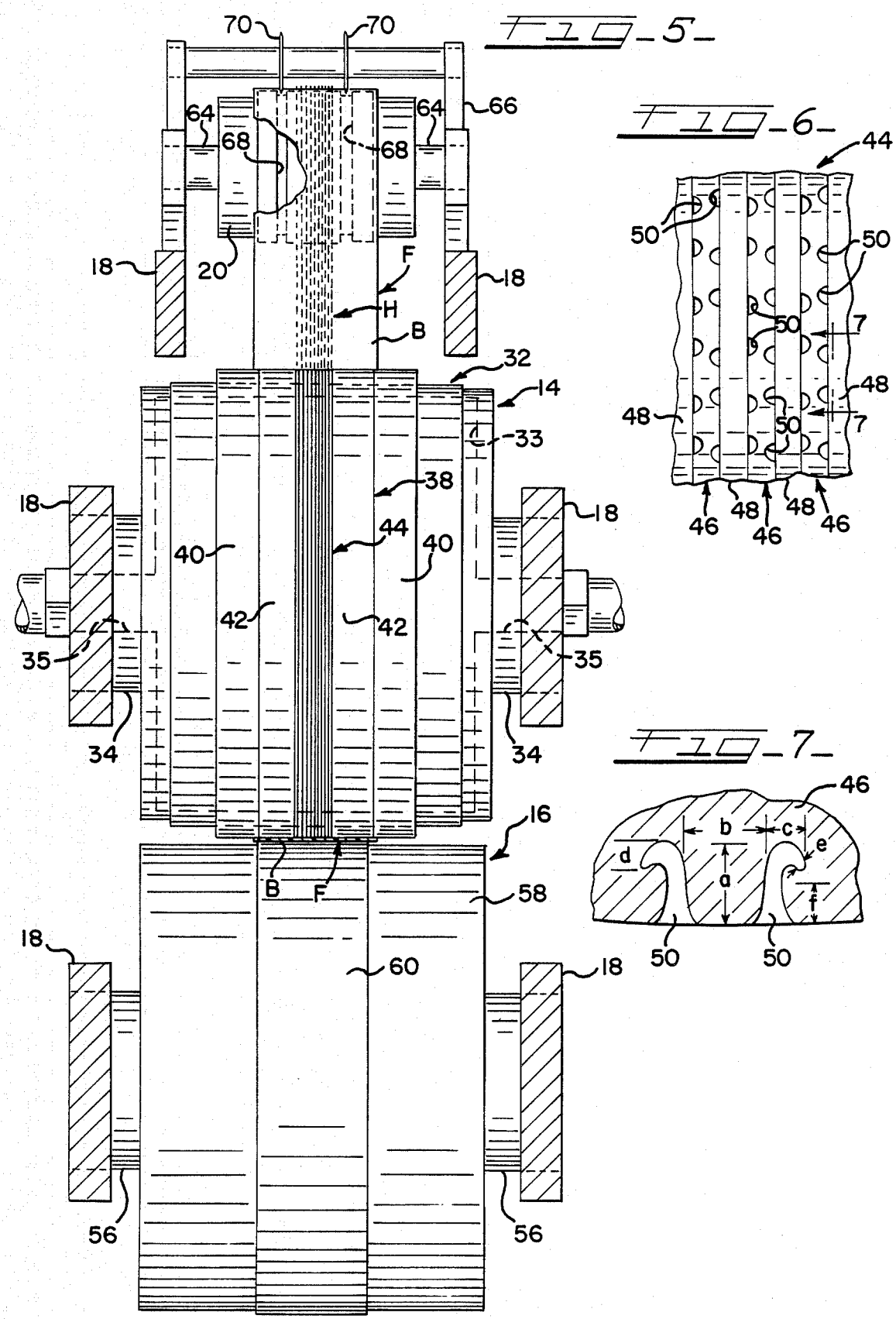

METHOD FOR CONTINUOUSLY PRODUCING A MULTI-HOOK FASTNER MEMBER AND PRODUCT OF THE METHOD

This is a continuation, of application Ser. No. 600,990, filed Apr. 16, 1984, now abandoned.

TECHNICAL FIELD

The present invention relates generally to a method of producing a fastener member having a multiplicity of resiliently flexible, upstanding hook-like projections, and more particularly to a method of continuously producing such a fastener member by a combined extrusion/roll forming process.

BACKGROUND OF THE INVENTION

Strip-like fastener members comprising a great multiplicity of closely-spaced upstanding hook-like projections are used in many different applications for providing both releasable and semi-permanent connection of associated elements. These types of multi-hook fasteners are typically configured for coaction with a multi-loop or likewise "piled" element, with the multiple hooks engaging the closely-spaced multiple loops to provide the desired connecting or gripping action.

Depending upon the configuration of the multi-hook fastener member, many different types of materials and fabrics are adapted for coaction therewith to effect joining of the associated structures. Not only do such fastening devices have many applications for wearing apparel, recreational equipment, covers for cars and boats, and the like, such devices are further being advantageously employed in applications wherein the highly convenient connecting action promotes joining of associated structures in an essentially permanent manner. For example, such fastening devices are finding ever-increasing use in the automotive industry for efficient fabrication and assembly of components such as seats, interior trim, and the like.

Because the multi-hook fastener element of such fastening devices is often most advantageously and efficiently handled and used in an elongated, continuous strip form, various techniques have been developed for manufacture of such multi-hook fasteners in continuous strips. However, the difficulties associated with forming the large number of relatively small hook-like projections required for the desired fastening action has heretofore led those skilled in the art to resort to relatively complex forming devices and/or processes.

By way of example, U.S. Pat. No. 3,147,528, to Erb, discloses an openable injection mold having a large number of projection-forming cavities which open upwardly to a generally flat surface at the top of the mold. The cavities are defined by a series of separable mold plates. In use, a piece of fabric is positioned atop of the mold plates, and moldable material is forced through the fabric so that it enters the cavities of the mold, thus forming a multi-hook fastener member. Since the mold itself is of a discrete length, formation of a continuous strip-like fastener member calls for relatively inefficient sequential or stepwise formation of individual segments of the member in end-to-end relation.

U.S. Pat. No. 3,758,657, to Menzin et al, discloses an apparatus for producing a continuous multi-hook fastener member. The apparatus includes a drum-like apparatus which includes a relatively complex arrangement of shiftable plates at its periphery which define cavities for forming hook-like projections. A plastic extruder is provided in close association with the drum so that as the drum rotates, plastic is injected into the hook-shaped cavities and is joined to a backing strip. Removal of the fastener member thus formed is accomplished by inwardly shifting alternate ones of the cavity-defining plates so that the cavities are opened to permit removal of the hook-like projections.

As will be appreciated, the above forming techniques require relatively complex equipment, and overall efficiency suffers due to the required opening of the hook-forming cavities to permit removal of the hook projections therefrom without damage or unacceptable deformation. The present method of forming a multi-hook fastener member affords a substantial improvement in the efficiency with which such members can be formed by permitting continuous formation of such a strip-like fastener member without unduly complex forming machinery.

SUMMARY OF THE INVENTION

A method of continuously producing an elongated strip-like fastener member is disclosed which employs relatively straightforward forming equipment to provide desired efficiency and economy in the forming of such fastener members. In essence, the present invention contemplates the continuous formation of a strip-like fastener member by forming the member from a continuous extrusion of plastic material. Forming rollers are employed for shaping the extrusion to the desired multi-hook configuration, with one of the rollers defining hook-forming cavities within which the multiplicity of hook-like projections of the finished fastener are formed.

Significantly, it has been found that by appropriately cooling the cavity-defining roller, a substantial reduction in the temperature of the fastener member is effected as it is carried by the cavity-defining roller through a substantial portion of a revolution thereof. The highly desirable result of this technique is the capability of removing the fastener from the forming roller without opening the hook-defining cavities thereof. The use of relatively complex forming equipment is thus avoided, with the desirable efficiency of a continuous process facilitating highly economical fabrication of such fastener members.

The fastener member formed in accordance with the present process comprises a base portion, and a great multiplicity of closely-spaced, resiliently flexible hook-like projections which extend integrally from one surface of the base portion. Notably, the hook-like projections of the fastener member include free end portions which extend generally radially away from and preferably generally toward the base portion to promote the desired interaction with an associated multi-loop element. This desired interaction is further promoted by the configuration of the hook projections wherein at least some adjacent ones of the projections, in a direction along the length of the fastener member, extend in generally opposite directions.

The present method first comprises the step of forming a strip-like extrusion of molten plastic material which can be very efficiently performed with conventional extruding equipment. Readily extrudable materials such as nylon and polypropylene have been found to provide the finished fastener member with the desired fastening characteristics, but it will be recognized that other extrudable and formable plastic materials may alternately be employed.

The present process further includes the step of providing a first, cooled forming roller having a large plurality of hook-forming cavities defined about its entire periphery. The hook projections of the fastener member are formed within the cavities, with each cavity thus including an inner end portion extending in a direction toward the periphery of the forming roller. To facilitate removal of the hook projections from the cavities, each cavity preferably is provided with an inwardly tapering configuration at the throat of each cavity, i.e., the portion which extends inwardly from the periphery of the forming roller.

The present method further includes providing a second pressure roller in position for coaction with the first forming roller, and concurrently rotating the first and second rollers in opposite directions about respective parallel axes. During practice of the method, a gap is established at the interface of the first and second rollers which generally corresponds to the thickness of the base portion of the fastener member being formed.

Formation of the fastener member is effected by extruding the material into the nip or interface between the first and second rollers so that the plastic material fills the hook-forming cavities in the first, cooled roller. Thus, the fastener member is formed with its base portion and a great multiplicity of hook-like projections extending integrally from one surface of the base portion. In some applications, it can be desirable to relieve the pressure at the laterally opposite sides of the base portion of the fastener member at the interface of the first and second rollers. Pressure relief is accomplished by permitting unconfined lateral flow of the molten plastic material at the roller interface.

As noted, the first forming roller is cooled, and cooling of the fastener member being formed is thus effected by carrying the fastener member on the periphery of the rotating, cooled forming roller. Careful control of the cooling, as well as appropriate selection of the linear forming seed and extrusion temperature, have been found to promote the formation of the multiple hook-like projections without opening of the hook-forming cavities for removal of the projections. Excessive cooling of the forming roller acts to prevent complete filling of the cavities, while insufficient cooling does not sufficiently cool and solidify the plastic material to permit the desired removal of the fastener member from the forming roller without unacceptable deformation of the hook projections.

The continuous fastener member is removed from the cooled forming roller by tensioning the member through the use of belt pullers positioned downstream of the forming rollers. The removal or stripping of the fastener member is effected at a position spaced from the interface of the first and second rollers to thus provide the desired cooling of the fastener member prior to its removal.

During development of the present process, it has been found that the above-described pressure relief at the interface of the first and second rollers can result in the base portion of the fastener member being excessively wide. Depending upon the configuration of the rollers, enlarged bead portions can also be formed at the laterally opposite sides of the base portion attendant the pressure relief of the molten plastic material. To provide the fastener member with its desired finished width, and to avoid any uneven shrinkage or warpage that can occur from the presence of the enlarged bead portions, the present method contemplates trimming the laterally opposite sides of the base portion of the fastener member immediately after removal of the member from the forming roller. For this purpose, a rotatably mounted trim roller is provided, with suitable trimming knives further provided to effect trimming of the fastener member to the desired finished width.

Numerous other features and advantages of the present invention will become readily apparent from the following detailed description, the accompanying drawings, and the appended claims.

BRIEF DESCRIPTION OF THE DRAWINGS

FIG. 1 is a diagrammatic, side elevational view of apparatus employed for practicing a method embodying the principles of the present invention;

FIG. 2 is an enlarged side elevational view, in partial cross-section, illustrating molten plastic extrusion into the nip or interface between first and second coacting forming rollers in accordance with the present invention;

FIG. 3 is a further side elevational view illustrating formation and trimming of a fastener member in accordance with the present method;

FIG. 4 is a perspective view of a portion of the continuous fastener member formed in accordance with the present method;

FIG. 5 is a view taken generally along lines 5—5 of FIG. 3 further illustrating formation and trimming of the fastener member formed in accordance with the present method;

FIG. 6 is an enlarged view of the surface of the cooled forming roller employed in the present method illustrating hook-forming cavities in the periphery of the roller; and FIG. 7 is a greatly enlarged side elevational view taken generally along lines 7—7 of FIG. 6 of the hook-forming cavities defined by the cooled forming roller employed in practicing the method incorporating the present invention.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 4, therein is illustrated a portion of the continuous, elongated strip-like fastener member, designated F, formed in accordance with the present method. The fastener member F is of a multi-hook configuration, and includes a strip-like base portion B from one surface of which integrally projects a great multiplicity of closely-spaced resiliently flexible hook-like projections H. Depending upon the desired application for the fastener member, the base portion B may extend laterally beyond the portion thereof from which hooks H project, thus providing side surfaces through which stitching or the like may be provided for affixing the member in place. Naturally, adhesives, or suitable mechanical fastening means can alternately be employed.

The fastener member F is adapted for fastening coaction with a multi-loop member having a great multiplicity of closely spaced loop elements. Accordingly, a relatively large number of the hook projections H are provided in closely spaced relation. In a current embodiment, the base portion B of the fastener member has been provided with an overall width of approximately 1 inch, with the base portion B including lateral side portions which flank the hook projections H of approximately 3/16 inch each. As will be further described, in one embodiment, approximately 80 hooks per linear inch have been provided. The hook projections H are arranged in "rows" in a direction longitudinally of the fastener member, with approximately seven of the projections H provided in each row per inch of length of the member, and with twelve continuous longitudinal rows of the projections provided.

Notably, each hook projection H is provided with a configuration wherein the free end portion of each projection extends generally radially away from and generally toward the base portion B of the fastener member. It should further be noted that adjacent ones of the hook projections face in generally opposite directions in a direction along the length of the fastener member. These features of the construction promote the desired interaction with the associated multi-loop fastener element, and assure the desired gripping or fastening action between the multi-hook fastener member and the multi-loop element.

FIG. 1, illustrates the various pieces of equipment which can be employed for practicing the present method. An extruder 10, which may be of a conventional configuration, is provided, and includes an extruder head 12 through which an extrusion, designated E, of molten plastic material is forced.

The forming equipment further includes a pair of first and second forming rollers, respectively designated 14 and 16, which are mounted for concurrent rotation in opposite directions on respective parallel axes on a support frame 18. The first roller 14 comprises a cooled forming roller which defines a great multiplicity of hook-forming cavities about its entire periphery for formation of the hook projections H of the fastener member F. The second roller 16 comprises a pressure roller which coacts with the cooled forming roller for formation of the fastener member. The second pressure roller 16 is preferably mounted for movement relative to the forming roller 14 to facilitate direction of the extrusion E therebetween at the interface of the rollers, to permit adjustment of the gap between the rollers for adjusting the thickness of the base portion B of the fastener member, and to facilitate adjustment of the pressure created at the interface on the molten plastic material.

FIG. 1 further illustrates the provision of an idler-like trim roller 20 rotatably mounted just above forming roller 14. The trim roller 20 is mounted in a position such that the fastener member F being formed is guided thereabout, with the fastener member being removed or stripped from the forming roller 14 immediately upstream of the trim roller 20.

FIG. 1 further illustrates the provision of a cooling conveyor 22 which supports the fastener member F subsequent to its formation. The use of cooling conveyor 22 is optional in practicing the present method in that it is presently preferred that the fastener member F be cooled in ambient air, and thus the member need not necessarily be supported for cooling on a conveyor such as 22.

A driven belt puller 24 is positioned downstream of cooling conveyor 22 for creating tension in the fastener member F for effecting the removal of the fastener member from the forming roller 14. The belt puller 24 may comprise a pair of coacting, opposed puller belts 26 which engage respective upper and lower surfaces of the continuous fastener member F for creating the desired tension therein. Puller belts 26 may comprise suitable neoprene rubber or the like.

A winder 28 positioned downstream of puller 24 effects winding of the finished continuous fastener member F on spools 30 for subsequent shipment, storage and use.

With particular reference now to FIGS. 2–7, the preferred configuration of cooled forming roller 14 will now be described. The forming roller 14 comprises a hollow drum 32 which defines an interior water passage 33 for effecting cooling of the roller. The drum 32 is supported for rotation about its respective axis by a driven support shaft 34 which defines suitable cooling passages 35 which communicate with the interior 33 of the roller drum 32. The support shaft 34 is suitably supported on frame 18 to permit positioning of the forming roller 14 in close association with extruder head 12 of extruder 10.

A forming plate assembly, generally designated 38, is carried on the external surface of the roller drum 32. The external surface of the roller drum is suitably threaded for receiving a pair of ring-like threaded members 40 which are positioned on respective opposite sides of the forming plate assembly 38. This construction facilitates fabrication of the roller 14, and readily permits re-configuration of its cavity-defining periphery as may be required for forming the fastener member F in its desired configuration.

The forming plate assembly 38 includes a pair of ring-like side plates 42 respectively positioned inwardly of the threaded members 40, with the side plates 42 flanking a cavity-defining plate assembly designated 44. As best illustrated in FIG. 6, the plate assembly 44 includes an alternating series of ring-like etched or engraved plates 46, and substantially flat backing plates 48, which together define hook-forming cavities 50 within which hooks H of fastener member F are formed. As will be recognized, this configuration of plate assembly 44 readily facilitates formation of the cavities 50 by suitably etching or engraving the plates 46, and thereafter assembling the series of the etched plates and the backing plates 48 between the side plates 42. The ring-like threaded members 40 thus function in the nature of spanner nuts for holding the plates 42, 46, and 48 in position together on the roller drum 32.

The plates 46 and 48 may comprise suitably hardened steel to facilitate the engraving or etching of the plates 46 for forming the cavities 50. As will be appreciated, the provision of six of the etched plates 46, with opposite sides of each plate suitably etched or engraved, effects formation of fastener member F with twelve continuous longitudinal rows of hook projections H. In a current embodiment, each of plates 46 and 48 have been provided with an outside diameter of 8 inches, and a thickness of 1/16 inch.

FIG. 7 illustrates a current embodiment of the hook-forming cavities 50. In this embodiment, each cavity is provided with a dimension at "a" of approximately 0.093 inches, with spacing between the cavities at dimension "b" being approximately 0.090 inches. The dimension of each cavity in a direction peripherally of the forming roll 14 is designated at "c" and is on the order of of 0.075 inches. The free end portion of each cavity which extends generally toward the periphery of the plate 46 is indicated at "d" and is approximately 0.045 inches. The end portion of each cavity at dimension "e" is on the order of approximately 0.030 inches.

The above-described dimensions for the hook-forming cavities 50 have been specifically selected to facilitate both complete filling of the cavities during formation of the hook projections H as well as removal of the projections H from the cavities without opening of the cavities. In this regard, it will be noted that the base portion or throat of each cavity 50 which opens toward the periphery of the forming roller is provided with a tapering configuration at dimension "f" for approximately 0.030 to 0.045 inches. In the region of each cavity 50 where the dimension "f" is indicated, each cavity is provided with a "depth" (i.e., the depth of engraving or etching) which is preferably on the order of 0.015 inches or greater. The depth of each cavity beyond this relatively enlarged portion is preferably on the order of 0.010 inches. As will be recognized, the above-identified dimensions are intended as illustrative, and it will be recognized that many variations are possible with respect to the exact size, shape, and relative positioning of the cavities 50 in keeping the principles of disclosed herein.

As will be evident from the drawings, the hook-forming cavities 50 are provided in the periphery of the forming roller 14 such that adjacent ones of the cavities, in a direction circumferentially of the roller, extend or face in generally opposite directions. As noted, the hook projections H of fastener member F thus-formed are thereby configured for providing the desired gripping or fastening action with an associated multi-loop fastener element. It is important to note that the present method permits formation of the fastener member F with this desired configuration without unacceptable deformation of the hook projections H as they are removed from the hook-forming cavities 50 without opening of the cavities.

The configuration of the pressure roller 16 will now be described. Pressure roller 16 is supported on frame 18 for driven rotational movement by driven shaft 56. The pressure roller 16 is preferably sufficiently cooled to avoid adhesion of the plastic material to its roll surface comprises a roller drum 58 upon which a ring-like plate 60 is positioned for providing a forming surface for coaction with the forming plate assembly 38 of forming roller 14. By this arrangement, the rollers 14 and 16 are supported for concurrent rotation in opposite directions about respective parallel axes. To facilitate convenient relative positioning of the forming roller 14 and the pressure roller 16 for forming the base portion B of fastener member F to the desired thickness, the rollers are preferably supported on support frame 18 for relative movement, such as by suitable air pressure cylinders or the like operatively associated with the shaft 56 of presssure roller 16. The use of air pressure biasing of the pressure roller 16 into a position for coaction with the forming roller 14 desirably provides a means by which the pressure which is created at the interface of the rollers can be adjusted.

As best shown in FIG. 5, the forming roller 14 and the pressure roller 16 are configured to permit relief of pressure at the laterally opposite sides of their interface so that the lateral flow of plastic material at the interface is unconfined. This arrangement has been found to provide added flexibility in practicing the present method since sufficient molten plastic material can be provided in the form of extrusion E to assure complete filling of the hook-forming cavities 50, while at the same time excessive pressure is not created at the interface which could otherwise act to urge the rollers 14 and 16 away from each other. As will be appreciated, appropriate selection of the linear forming speeds of the fastener member F, as well as appropriate temperature control can avoid the need for providing pressure relief at the roller interface. In this regard, it will be observed in FIG. 2 that an enlarged "bank" designated P is formed just upstream of the interface of the forming roller 14 and the pressure roller 16. While it is desired that the bank P be of minimum dimension to avoid urging the rollers 14 and 16 apart, the creation of this bank assures the presence of an adequate supply of molten plastic material for complete filling of the hook-forming cavities 50.

As best illustrated in FIG. 5, it can be desirable to trim the laterally opposite sides of base portion B of fastener member F so that the fastener member is provided in its desired finished width. Trimming in this manner is preferably effected as soon as possible after the formed fastener member F is removed or stripped from forming roller 14, and to this end, the idler-like trim roller 20 is provided just above forming roller 14. The trim roller 62 is suitably rotatably supported by a trim roller shaft 64 mounted in a frame 66 above frame 18. The trim roller 62 is preferably provided with a pair of spaced machined grooves 68 which generally correspond in lateral spacing to the width of the finished fastener member F. Trimming is effected by a pair of trim blades 70 carried on the frame 66, with the provision of grooves 68 permitting the blades 70 to efficiently cut and trim the strip-like fastener member without undue wear of the blades.

Trimming of the laterally opposite sides of base portion B of the fastener member can be particularly desirable in conjunction with formation of the fastener member with pressure reliefs at the laterally opposite sides of the interface of rollers 14 and 16. Not only does the trimming step desirably effect reduction of the fastener member F to its desired finished width, the trimming operation affords the further advantage of facilitating formation of the fastener member without any warpage or unevenness. Such unevenness can result from uneven shrinkage which could otherwise occur attendant to formation of the base portion B with pressure reliefs at the interface of rollers 14 and 16. Such trimming is particularly desirable if the base portion B is initially formed with enlarged bead portions at its laterally opposite edges (again for purposes of pressure relief) since uneven shrinkage which can occur without trimming can result in the finished fastener member F taking on a somewhat "wavy" configuration. Notably, the trimmed portions of the fastener member can be recycled through extruder 10 for efficient use of materials.

During development of the present method, the fastener member F has been formed from both polypropylene and nylon. While polypropylene plastic resins are somewhat easier to extrude and process, the hook projections H of the resultant fastener member F are somewhat more flexible than when the fastener member is formed from nylon, and thus the gripping force generated with an associated multi-loop element is somewhat less. While fabrication from nylon calls for higher extrusion temperatures, the resultant fastener member is provided with hook projections H which are of relatively greater rigidity and resilience, and thus a greater fastening or gripping force is created when the fastener member is positioned in association with a multi-loop fastener element.

In forming the fastener member F from polypropylene plastic material, the material is preferably extruded from extruder 10 at a temperature on the order of approximately 380°–440° F. The extrusion E from extruder head 12 is preferably on the order of approximately ⅛ inch thick with a width of approximately 1 inch for forming the fastener member F with a finished width of approximately 1 inch (after trimming), with the base portion B of the fastener member being approximately 0.010–0.012 inches thick.

A linear forming speed on the order of 30–45 feet/minute has been found to facilitate the desired complete formation of the hook projections H in the hook-forming cavities 50 of the forming roller 14. In this regard, the best results have been obtained by maintaining the temperature of the surface of the forming roller 14 in the range of approximately 100°–150° F. As will be observed from the drawings, the fastener member F is carried on the periphery of the rotating forming roller 14 through approximately 120°–180° of rotation of the forming roller before the fastener member is removed or stripped from the forming roller by guidance about trim roller 62. In this manner a substantial reduction in the temperature of the plastic material is effected, with this reduction being on the order of 250°–350° F.

Formation of fastener member F from Celanese Nylon No. 1200, natural, has been effected with extrusion temperatures on the order of approximately 550° F. A linear forming speed of approximately 40–45 feet/minute has provided the desired results, again with the temperature of the surface of the forming roller 14 being maintained in the range of approximately 100°–150° F. A temperature reduction in the plastic material of approximately 300°–350° F. is effected as the fastener member is carried on the cooled forming roller 14.

From the foregoing description of the present method and the fastener member thus obtained, it will be appreciated that many different aspects of the method can be selectively varied for achieving the results desired. The tension which is created within the completed fastener member F by belt puller 24 can be readily adjusted and varied by altering the speed of the puller and/or the speed of the forming and pressure rollers 14 and 16. The linear forming speed of the fastener member can likewise be readily varied, with the understanding that proper cooling of the forming roller 14 is necessary to assure complete filling of the hook-forming cavities 50 while still permitting solidification and withdrawal of the hook projections H of the fastener member from the cavities without unacceptable deformation. While polypropylene and nylon have been successfully employed for practicing the present method, it will be appreciated that many different plastic materials lend themselves to use in forming the fastener member F by the continuous method of the present invention.

From the foregoing, it will be observed that numerous modifications and variations can be effected without departing from the true spirit and scope of the novel concept of the present invention. It is to be understood that no limitation with respect to the specific embodiment disclosed herein is intended or should be inferred. It is, of course, intended to cover by the appended claims all such modifications as fall within the scope of the claims.

What is claimed is:

1. A method suitable for continuously producing an elongated strip-like fastener member, comprising the steps of:

forming a strip-like extrusion of plastic material;

providing a first, cooled forming roller having a plurality of hook-forming cavities defined about the periphery thereof, each of said hook-forming cavities including a throat portion adjacent the periphery of said forming roller, and an inner end portion communicating with said throat portion, said inner end portion of each said hook-forming cavity extending in a direction generally toward the periphery of said forming roller;

providing a second pressure roller in position for coaction with said first forming roller;

concurrently rotating said first and second rollers in opposite directions about respective parallel axes;

directing said extrusion in between said first and second rollers at an interface thereof so that said plastic material fills said hook-forming cavities to form a base portion of said strip-like fastener member and a great multiplicity of hook-like projections extending integrally from one surface of said base portion;

cooling said fastener member to a desired temperature by carrying it on the periphery of said rotating, cooled forming roller; and removing said strip-like fastener member from said first forming roller at a position spaced from the interface of said first and second rollers without opening said hook-forming cavities after sufficiently cooling the hook-like projections so that said hook-like projections are withdrawn from said hook-forming cavities without unacceptable deformation of the hook-like projections, each said hook-like projection having a free end portion extending generally toward the base portion of said fastener member.

2. A method of producing a fastener member in accordance with claim 1, including forming an enlarged bank of said extruded plastic material immediately upstream of the interface of said first and second rollers to facilitate filling of said hook-forming cavities with said plastic material.

3. A method of producing a fastener member in accordance with claim 1, including relieving pressure at the laterally opposite sides of said base portion of said fastener member at the interface of said first and second rollers.

4. A method of producing a fastener member in accordance with claim 1, including trimming laterally opposite sides of said base portion of said fastener member after removal thereof from said first forming roller.

5. A method of producing a fastener member in accordance with claim 1, wherein said hook-forming cavities are provided in said first forming roller such that at least some adjacent ones of the inner end portions of said cavities, in a circumferential direction of said forming roller, extend in generally opposite directions and causing said material to flow into said cavities in said opposite directions.

6. A method of producing a fastener member in accordance with claim 1, including
maintaining the temperature of the cavity-defining periphery of said first forming roller in the range of approximately 100°-150° F. to facilitate complete filling of the cavities and removal of said hook-like projections from said cavities.

7. A method suitable for continuously producing an elongated strip-like fastener member having a base portion and a great multiplicity of hook-like project extending integrally from one surface of said base portion, comprising the steps of:
forming a strip-like extrusion of molten plastic material;
providing a first, cooled forming roller having a plurality of hook-forming cavities defined about the periphery thereof wherein each said cavity includes a throat portion adjacent the periphery of said forming roller having an inwardly tapering configuration, and each said cavity includes an inner end portion communicating with the throat portion thereof and extending in a direction back toward the periphery of said forming roller;
providing a second pressure roller in position for coaction with said first forming roller;
concurrently rotating said first and second rollers in opposite directions about respective parallel axes;
directing said extrusion in between said first and second rollers at an interface thereof so that said plastic material fills said hook-forming cavities to form said base portion of said strip-like fastener member and with said hook-like projections extending integrally from one surface of the base portion, each said hook-like projection having a free end portion;
cooling said fastener member to a desired temperature by carrying it on the periphery of said rotating, cooled forming roller through a substantial portion of a revolution of said forming roller; and
removing said strip-like fastener member from said first forming roller at a position spaced from the interface of said first and second rollers by maintaining tension on the elongated fastener member thus-formed so that said hook-like projections are withdrawn from said hook-forming cavities, after being sufficiently cooled so that unacceptable deformation of the hook-like projections is avoided, without opening said cavities by drawing the free end portion of each said hook-like projection through the throat portion of the respective one of said cavities, the free end portion of each said hook-like projection extending generally toward the base portion of said fastener member.

8. A method of producing a fastener member in accordance with claim 7, wherein
said hook-forming cavities are provided in said first forming roller such that at least some adjacent ones of said cavities, in a circumferential direction of said forming roller, extend in generally opposite directions.

9. A method of producing a fastener member in accordance with claim 8, including
trimming laterally opposite sides of said base portion of said fastener member after removal thereof from said first forming roller.

10. A method of producing a fastener member in accordance with claim 9, including
relieving pressure at the laterally opposite sides of said base portion of said fastener member at the interface of said first and second rollers by permitting unconfined lateral flow of said molten plastic material at said interface.

11. A method of producing a fastener member in accordance with claim 8, wherein
said cooling step comprises cooling the periphery of said forming roller sufficiently to permit solidification of said hook-like projections in said hook-forming cavities for subsequent withdrawal therefrom while avoiding excessively cooling of the periphery of said forming roller to accommodate complete filling of said cavities with said molten plastic material.

12. A method of producing a fastener member in accordance with claim 11, including
maintaining the temperature of the periphery of said first forming roller in the range of approximately 100°-150° F.

13. A method suitable for continuously producing an elongated strip-like fastener member comprising the steps of:
forming a strip-like extrusion of plastic material;
directing said extrusion to a cooled forming roller having a plurality of hook-forming cavities defined about the periphery, each of said hook-forming cavities including a throat portion adjacent the periphery of said forming roller, and at least one inner end portion communicating with said throat portion, said inner end portion extending in a direction generally radially away from said throat portion;
providing pressure directed toward said extrusion and said forming roller;
rotating said forming roller while maintaining said pressure thereagainst such that said plastic material fills said hook-forming cavities to form a base portion of a strip-like fastener member and a great multiplicity of hook-like projections extending integrally from one surface of said base portion;
cooling said fastener member to a desired temperature by carrying it on the periphery of said rotating, cooled forming roller; and
separating said strip-like fastener member and said cooled forming roller downstream of the location of entry of said plastic material into said hook-forming cavities without opening the roll surface of said hook-forming cavities such that said hook-like projections are withdrawn therefrom when sufficiently cooled so that unacceptable deformation of the hook-like projections is avoided, each said hook-like projection having at least one free end portion extending generally radially away from said stem and generally toward said base.

14. The method according to claim 13 wherein said plastic material is nylon.

15. The method according to claim 13 wherein said plastic material is polypropylene.

16. A method suitable for continuously producing an elongated strip-like fastener member having a base member and a multiplicity of hook-like engaging elements in the form of projections upstanding therefrom, at least certain of said hook-like projections each having a resilient stem supported at one end thereof on said base member and at least one radial extension on the unsupported end of said stem, comprising the steps of:
forming a strip-like extrusion of plastic material;
directing said extrusion to a cooled forming roller having a plurality of hook-forming cavities defined about the periphery, each said hook-forming cavities including a throat portion adjacent the periphery of said forming roller, and at least one inner end portion communicating with said throat portion, each said inner end portion of each hook-forming cavity extending in a direction generally radially away from said throat portion and in a direction generally toward the periphery of said forming roller;

providing coactive pressure directed toward said extrusion and said forming roller;

rotating said forming roller while maintaining said coactive pressure thereaganist such that said plastic material fills said hook-forming cavities to form a base portion of a stirp-like fastener member and a great multiplicity of hook-like projections extending integrally from one surface of said base portion;

cooling said fastener member to a desired temperature by carrying it on the periphery of said rotating, cooled forming roller; and removing said strip-like member from said cooled forming roller at a position spaced from the location of entry of said plastic material into said hook-forming cavities without opennng said hook-forming cavities such that said hook-like projections are withdrawn therefrom when sufficiently cooled so that unacceptable deformation of the hook-like projections is avoided, each said hook-like projection having at least one free end portion extending generally toward said base portion.

17. The method according to claim 16, wherein said plastic material is nylon.

18. The method according to claim 16 wherein said plastic material is polypropylene.

19. A method suitable for continuously producing an elongated strip-like fastener member having a base member and a multiplicity of hook-like engaging elements in the form of projections upstanding therefrom, at least certain of said hook-like projections each having a resilient stem supported at one end thereof on said base member and at least one radial extension on the unsupported end of said stem, comprising the steps of:

forming a strip-like extrusion of plastic material;

directing said extrusion to a first cooled forming roller having a plurality of hook-forming cavities defined about the periphery thereof, each said hook-forming cavities including a throat portion adjacent the periphery of said forming roller, and at least one inner end portion communicating with said throat portion, each said inner end portion of each hook-forming cavity extending generally radially away from said throat portion and in a direction generally toward the periphery of said forming roller;

providing coactive pressure directed toward said extrusion and said forming roller by a second pressure roller in position for coaction with said forming roller;

concurrently rotating said first and second rollers in opposite directions about substantially parallel axes such that said plastic material fills said hook-forming cavities to form a base portion of a strip-like fastener member and a great multiplicity of hook-like projections extending integrally from one surface of said base portion;

cooling said fastener member to a desired temperature by carrying it on the periphery of said rotating, cooled forming roller;

removing said strip-like fastener member from said cooled forming roller at a position spaced from the location of entry of said plastic material into said hook-forming cavities without opening said hook-forming cavities such that said hook-like projections are withdrawn therefrom when sufficiently cooled so that unacceptable deformation of the hook-like projections is avoided, each said hook-like projection having at least one free end portion extending generally radially away form said stem and toward said base portion.

20. The method according to claim 19 wherein said plastic material is nylon.

21. The method according to claim 19 wherein said plastic material is polypropylene.

22. A method suitable for continuously producing an elongate strip-like member on an apparatus having a first cooled, forming roller defining a plurality of hook-forming cavities about the periphery thereof, each of said hook-forming cavities including a throat portion adjacent the periphery of said forming roller and an inner hook-forming portion communicating with said throat portion and extending generally toward said periphery, means for providing pressure directed toward said forming roller, comprising the steps of directing a strip-like extrusion of molten palstic material in between said forming roller and said pressure means at an interface thereof such that said plastic material fills said hook-forming cavities to form a base portion of said strip-like member and a great multiplicity of hook-like projections extending from one surface of said base portion and formed integrally therewith, at least partially cooling said member to a desired temperature by carrying it on the periphery of said rotating forming roller, and removing said strip-like member from said first forming roller at a position spaced from said interface of said forming roller and said pressure means such that said hook-like projections are withdrawn from said hook-forming cavities, only after being sufficiently cooled so that unacceptable deformation of the hook-like projections is avoided, without opening the roll surface defining said hook-forming cavities.

23. An elongate strip-like member formed in accordance with the method of claim 1.

24. An elongate strip-like member formed in accordance with the method of claim 7.

25. An elongate strip-like member formed in accordance with the method of claim 13.

26. An elongate strip-like member formed in accordance with the method of claim 16.

27. An elongate strip-like member formed in accordance with the method of claim 22.

* * * * *

UNITED STATES PATENT AND TRADEMARK OFFICE
CERTIFICATE OF CORRECTION

PATENT NO. : 4,794,028

DATED : December 27, 1988

INVENTOR(S) : James R. FISCHER

It is certified that error appears in the above-identified patent and that said Letters Patent is hereby corrected as shown below:

Cols. 10-14

Cancel claims 1, 13, 16, 17, 18, 19, 20, 21, 23, 25 and 26.

Cols. 10-11

In claims 2, 3, 4, 5 and 6, line 2 of each, change "claim 1" to --claim 7--.

Col. 12

In claims 14 and 15, line 1 of each, change "claim 13" to --claim 22--.

Col. 14

In claim 22, line 11, change "palstic" to --plastic--.

Title page "27 claims, 3 Drawing Sheets" should read --16 Claims, 3 Drawing Sheets--

Signed and Sealed this

Nineteenth Day of January, 1993

Attest:

DOUGLAS B. COMER

*Attesting Officer*   Acting Commissioner of Patents and Trademarks